No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)
(No Model.) 10 Sheets—Sheet 1.

Witnesses:
Josef Löhre
Carl Ruff

Inventor:
Emil Alfred Wahlström
by
Attorney

No. 685,072.   Patented Oct. 22, 1901.
E. A. WAHLSTRÖM.
ARRANGEMENT FOR CONTROLLING ELECTRIC ELEVATORS.
(Application filed Aug. 25, 1899.)
(No Model.)   10 Sheets—Sheet 3.

Witnesses:
Emil Kayser
Bernhard Hesse

Inventor
Emil Alfred Wahlström
by
Robert Ziegler
Attorney

No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)
(No Model.) 10 Sheets—Sheet 5.

Witnesses:
Josef Lohre
Carl Ruff

Inventor:
Emil Alfred Wahlström
by
Robert Seifler
Attorney

No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)
(No Model.) 10 Sheets—Sheet 6.

Witnesses:
Inventor:
Emil Alfred Wahlström
by
Attorney.

No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)

(No Model.) 10 Sheets—Sheet 7.

Witnesses:
Emil Kayser.
Bernhard Hense.

Inventor
Emil Alfred Wahlström
by
Robert Geipler
Attorney

No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)

(No Model.) 10 Sheets—Sheet 8.

Witnesses:
Emil Kayser
Bernhard Hene.

Inventor
Emil Alfred Wahlström
by
Robert Leiffer
Attorney.

No. 685,072. Patented Oct. 22, 1901.
E. A. WAHLSTRÖM.
ARRANGEMENT FOR CONTROLLING ELECTRIC ELEVATORS.
(Application filed Aug. 25, 1899.)
(No Model.) 10 Sheets—Sheet 9.
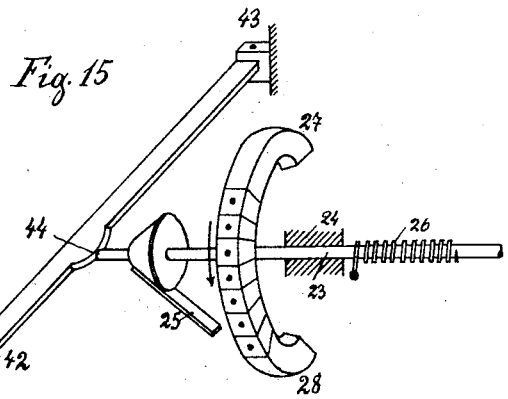
Fig. 15
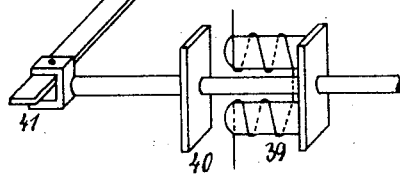
Fig. 15ª
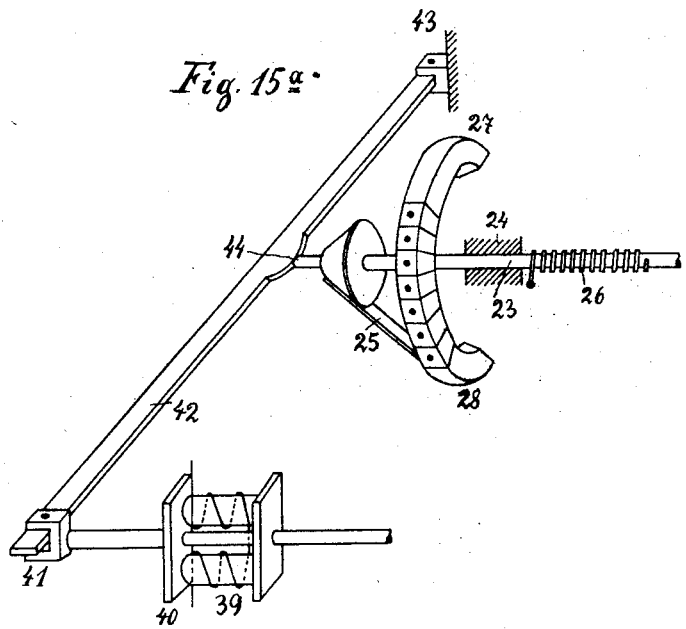
Witnesses:
Emil Kayser
Bernhard Hesse
Inventor
Emil Alfred Wahlström
by Robert Deipla
Attorney
THE NORRIS PETERS CO., PHOTO-LITHO., WASHINGTON, D. C.

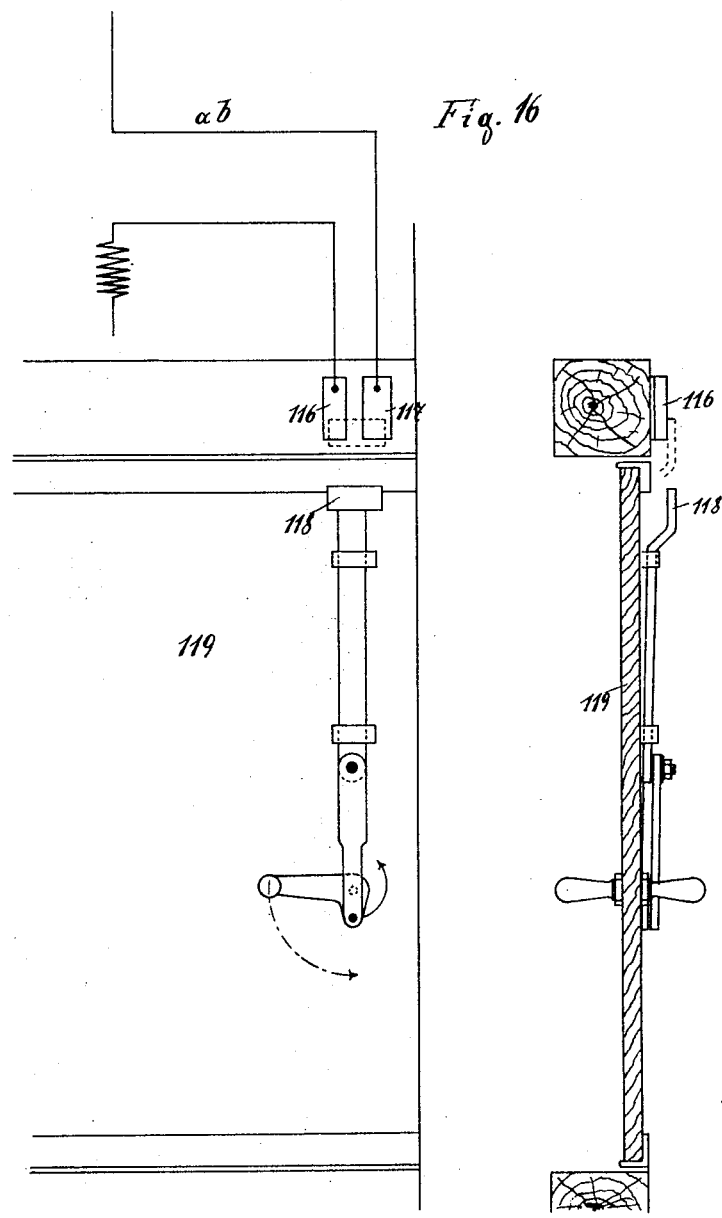

UNITED STATES PATENT OFFICE.

EMIL ALFRED WAHLSTRÖM, OF CANNSTADT, GERMANY.

ARRANGEMENT FOR CONTROLLING ELECTRIC ELEVATORS.

SPECIFICATION forming part of Letters Patent No. 685,072, dated October 22, 1901.

Application filed August 25, 1899. Serial No. 728,481. (No model.)

*To all whom it may concern:*

Be it known that I, EMIL ALFRED WAHLSTRÖM, a subject of the King of Würtemberg, and a resident of Cannstadt, in the Kingdom of Würtemberg, German Empire, have invented an Improved Arrangement for Controlling Electric Elevators, (for which an application for patent has been filed in Germany on the 28th of April, 1899,) of which the following is an exact specification.

The present application relates to an improved arrangement for controlling electric elevators—such as lifts, freight-elevators, and the like—and has for its object to provide means for allowing a correct controlling of such apparatus.

My invention will be readily understood with reference to the accompanying drawings and to the description following hereinafter.

Figure 1:
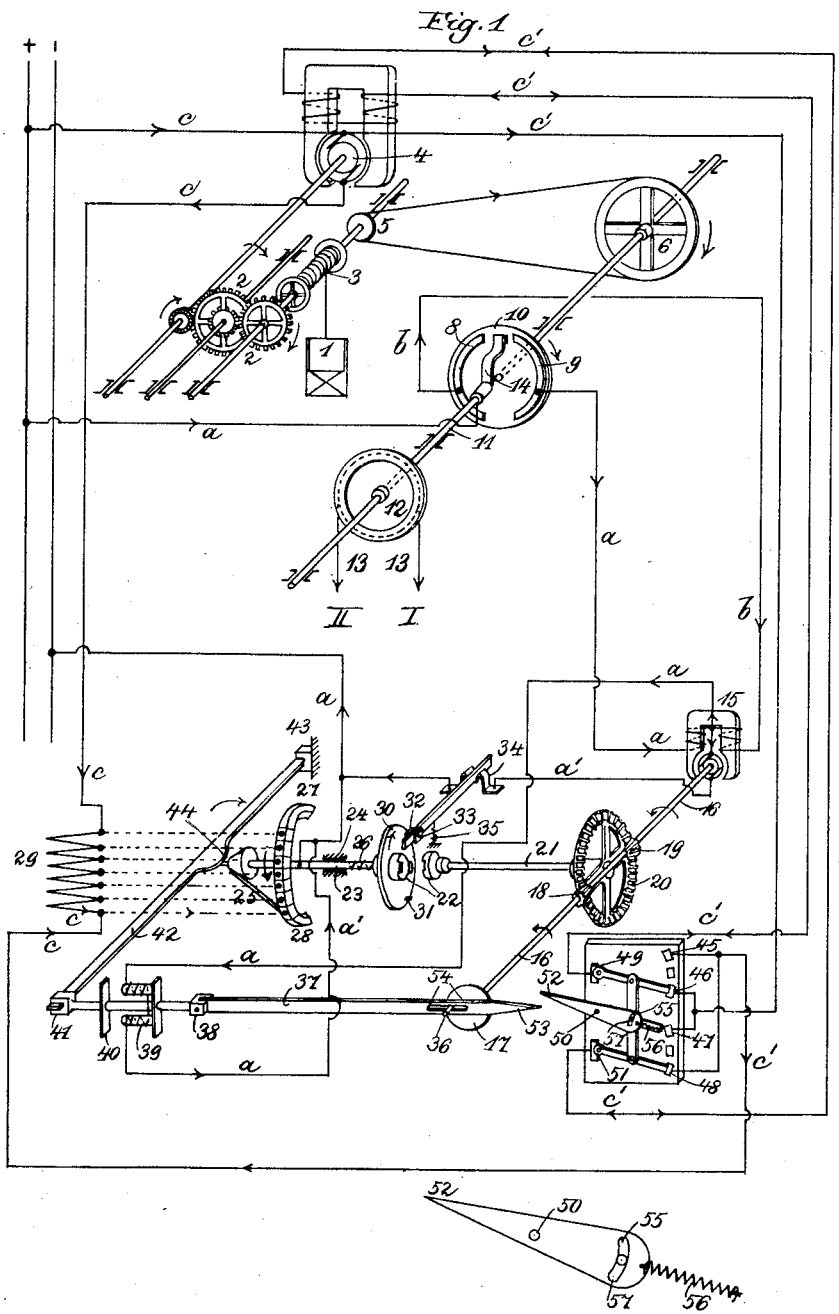
Figure 2:
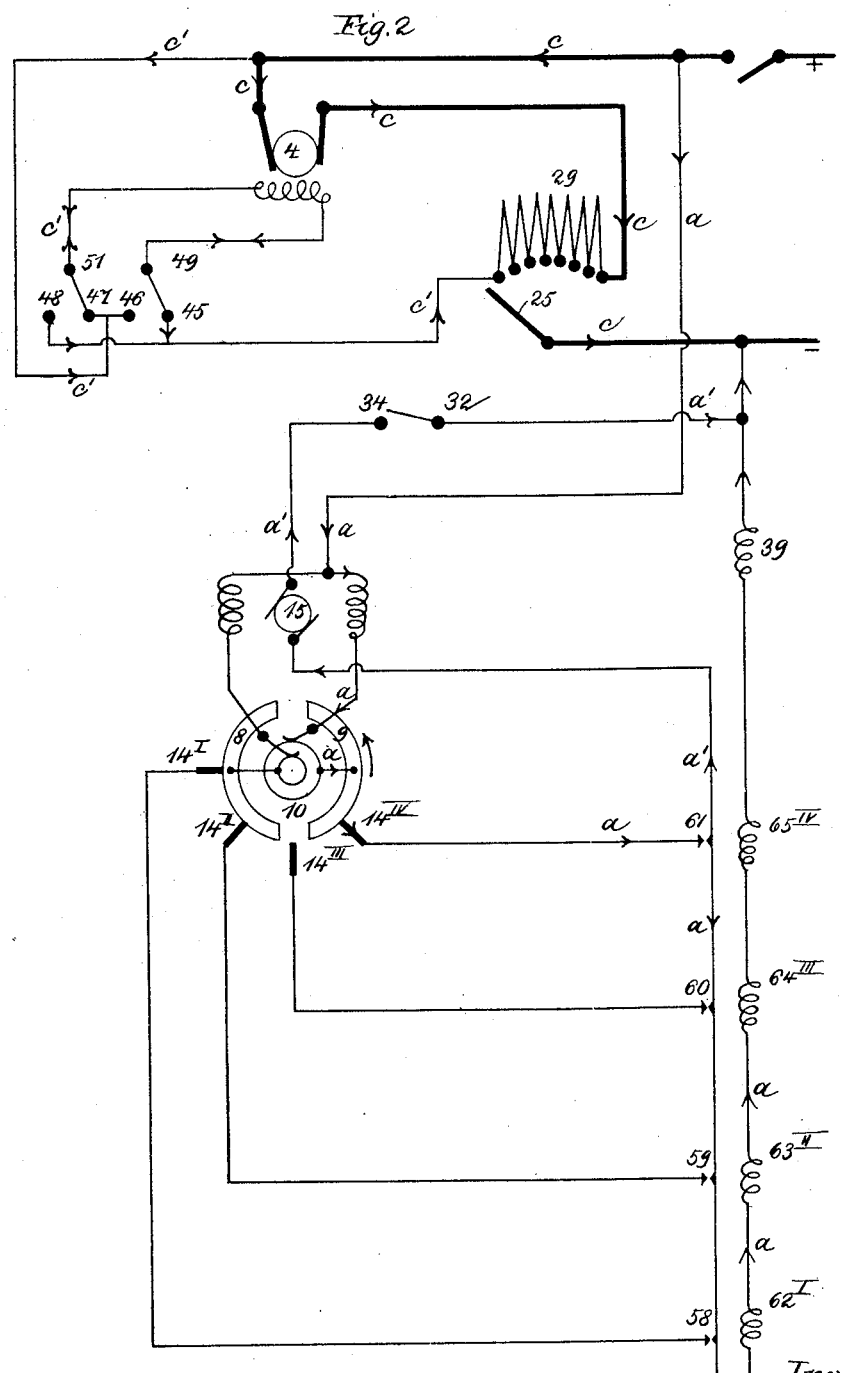
Figure 3:
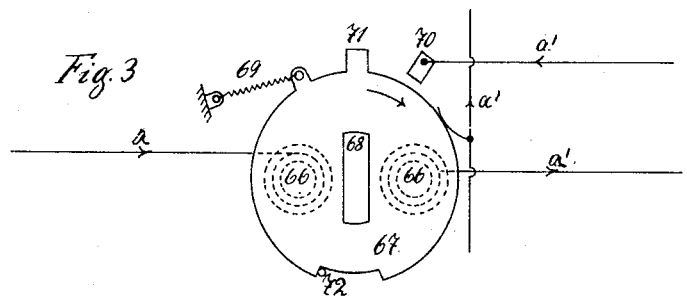
Figure 4:
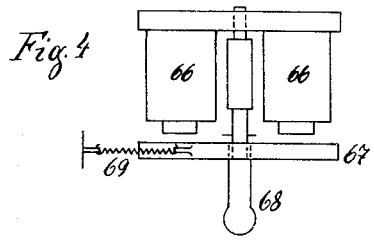
Figure 5:
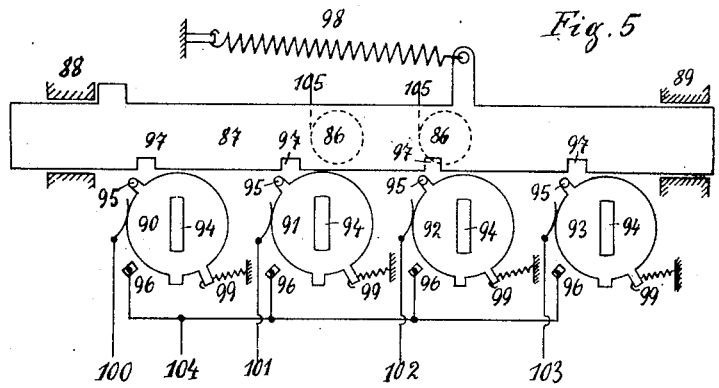
Figure 6:
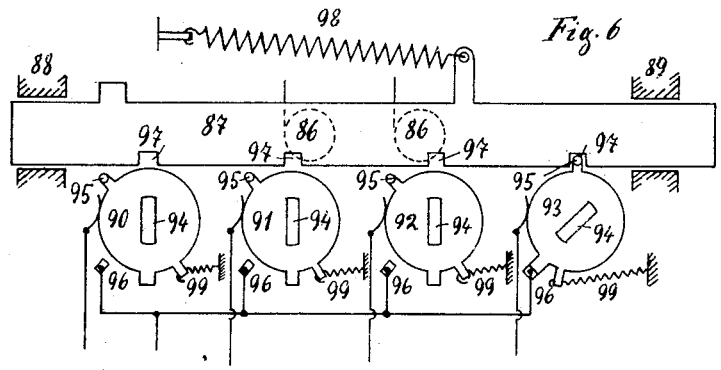
Figure 7:
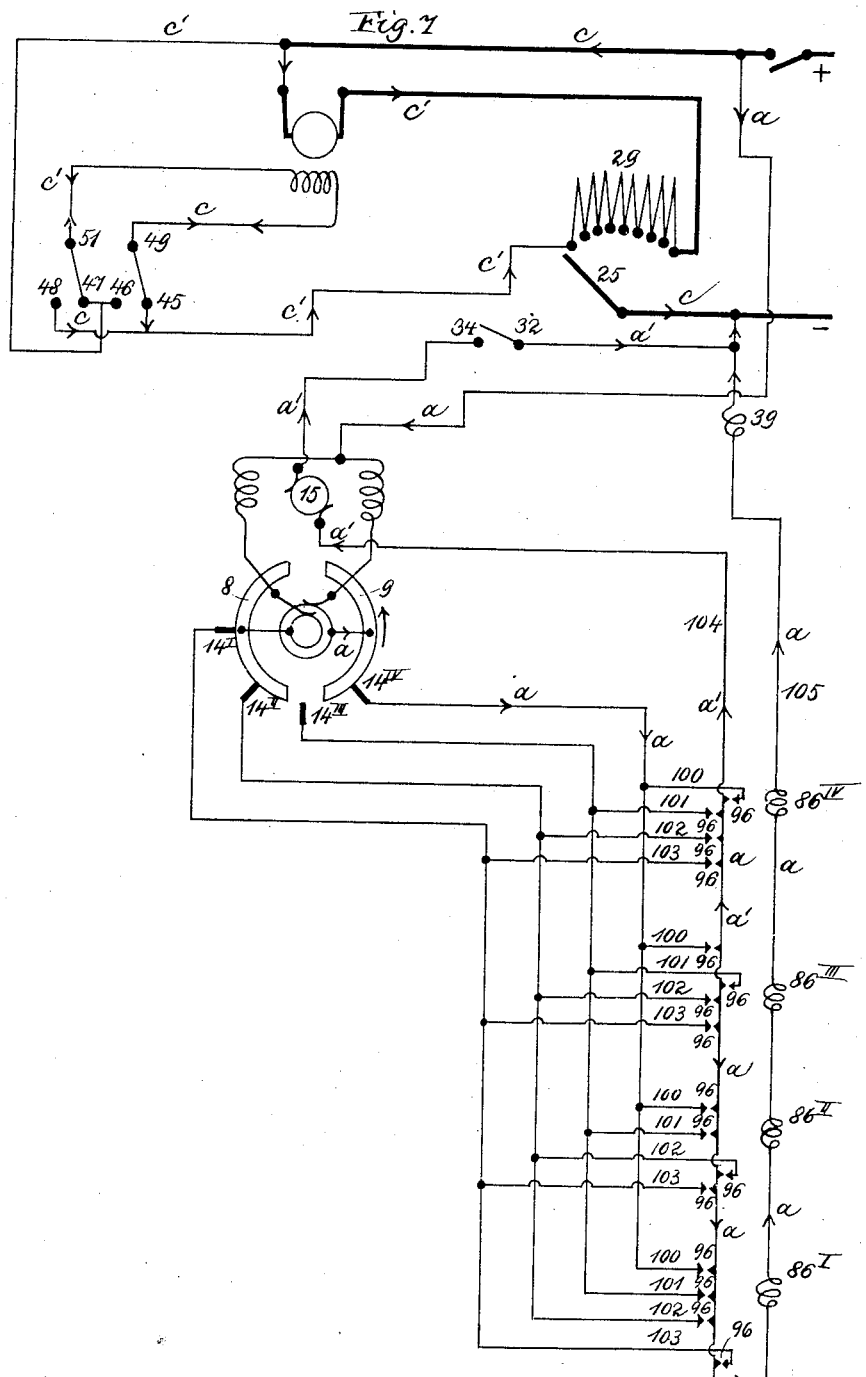
Figure 8:
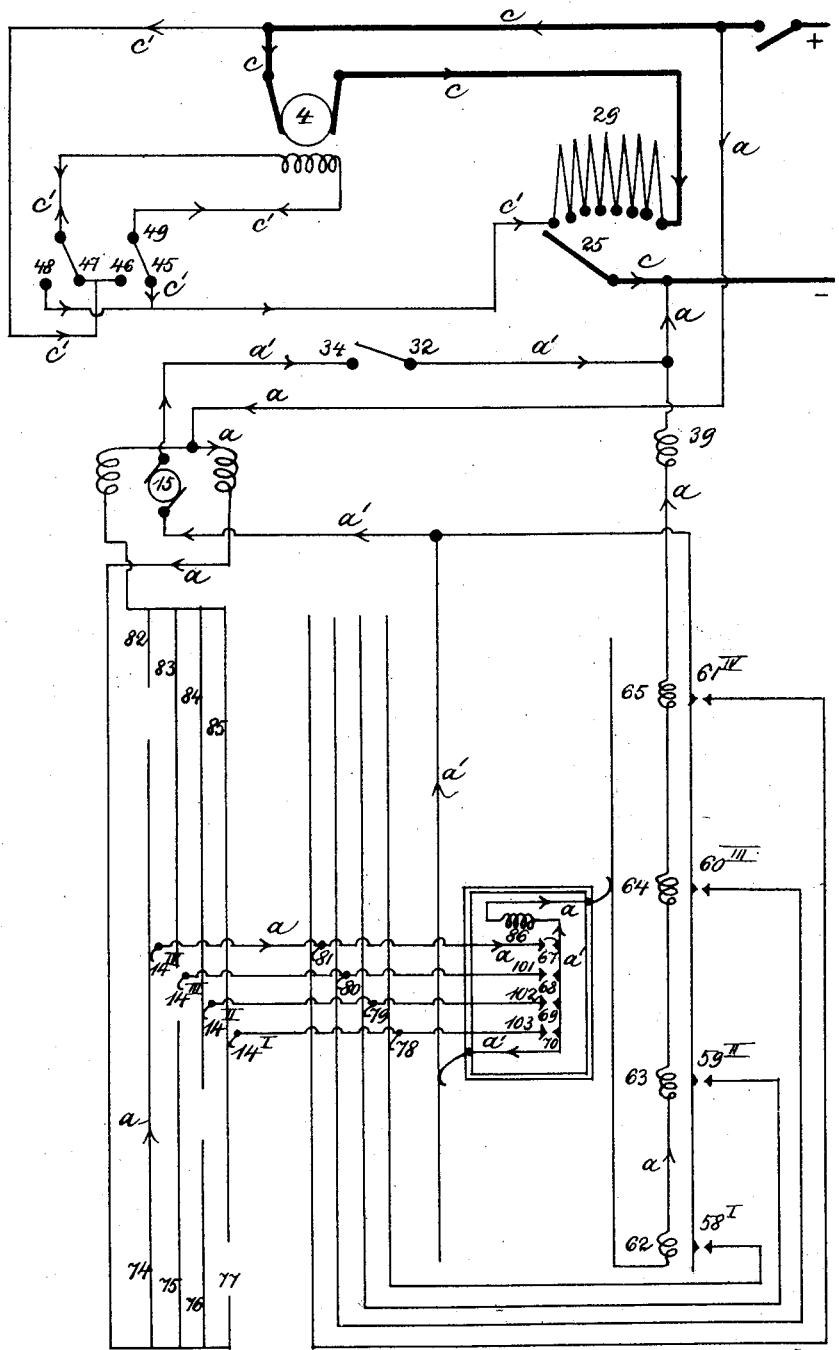
Figure 9:
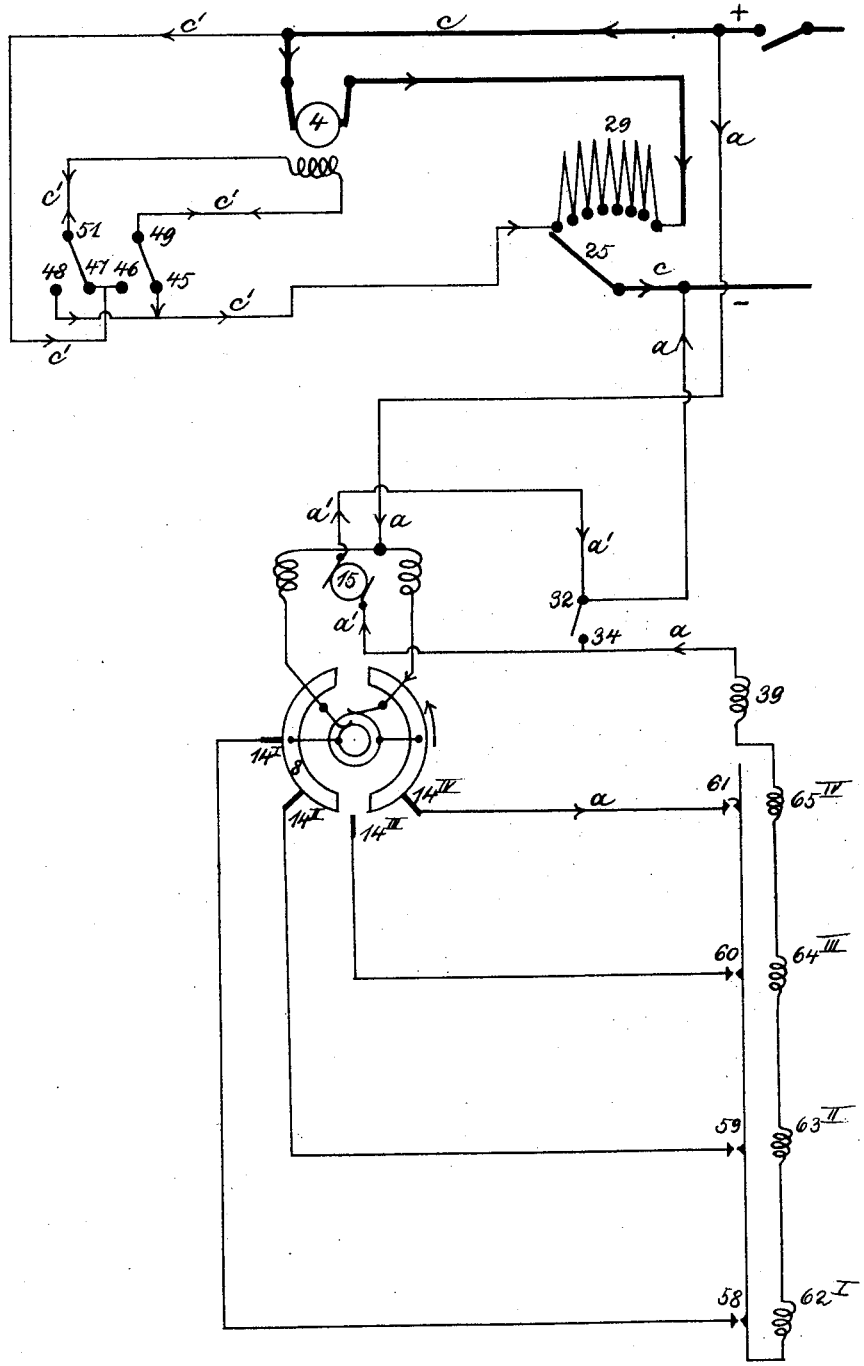
Figure 10:
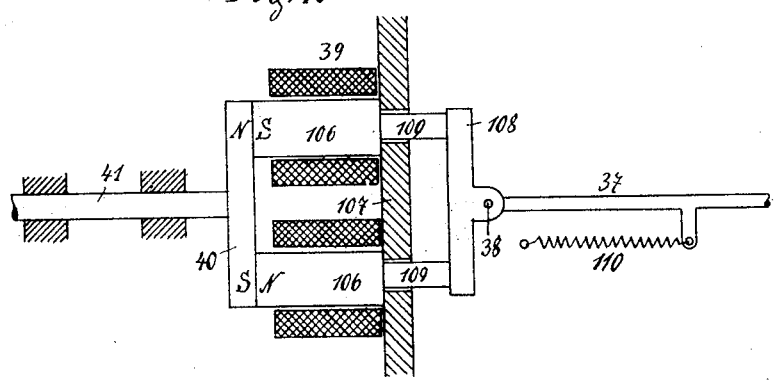
Figure 11:
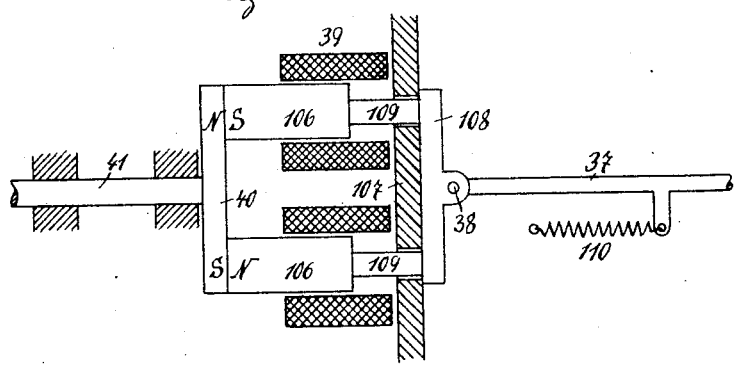
Figure 12:
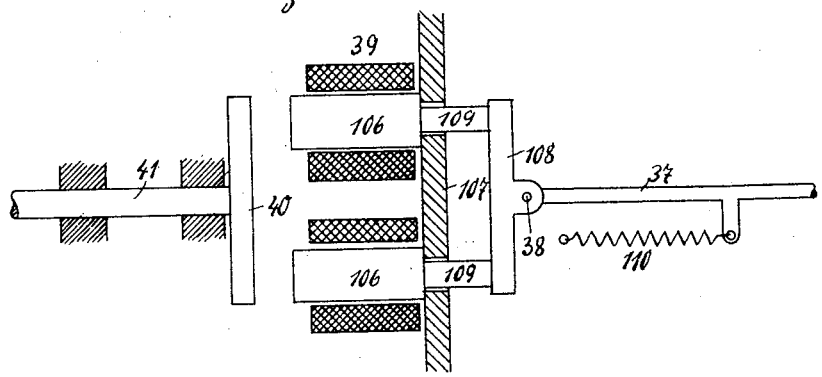
Figure 13:
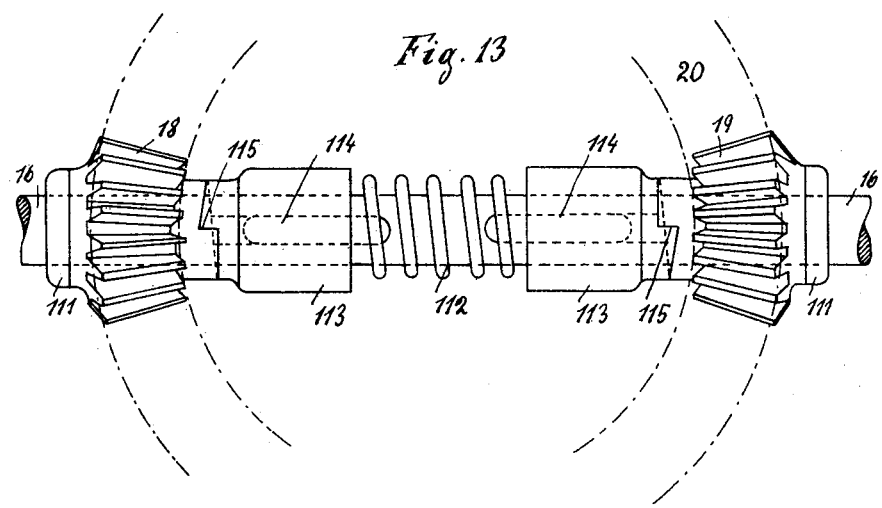
Figure 14:
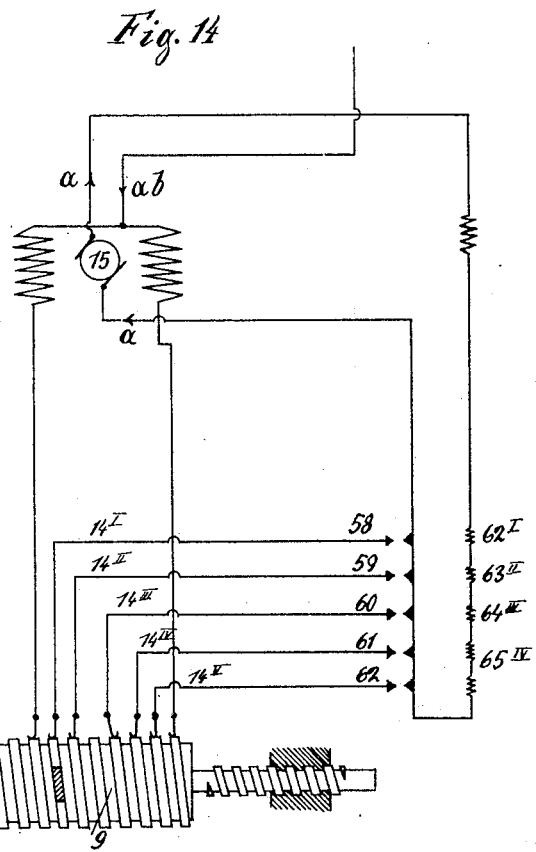

In the accompanying drawings, Figure 1 illustrates a diagrammatic view of the whole mechanism; Fig. 2, a diagrammatic view of a modified form of the governing mechanism. Figs. 3 and 4 are detail views of the commutator; Figs. 5 and 6, detail views of several commutators combined. Fig. 7 is a general diagrammatic view showing especially the arrangement of the switch mechanism with respect to the points of stop of the car. Fig. 8 illustrates a diagrammatic view, the switches being arranged within the shaft. Fig. 9 is a view similar to Fig. 8. Figs. 10, 11, and 12 are detail views of the electromagnetic coupling. Fig. 13 shows the bevel-wheel gearing; Fig. 14, a modified form of governing mechanism; Figs. 15 and 15ª, a detail view illustrating the contact series and the contact-brush. Fig. 16 illustrates the connection between the switch and the door.

Referring to Fig. 1, 1 represents the elevator-cage; 2, the winding-gearing; 3, the winding-drum; 4, the hoisting-motor, and 5 a driving-pulley for the pulley 6. The latter is fixed to a shaft 7, carrying, furthermore, a disk 10, provided with two contacts 8 and 9, so that when rotation is imparted to the pulley 6 the same is communicated to the disk 10. A shaft 11, arranged in line with the shaft 7, carries a pulley 12 with governing-rope 13 and a contact-spring 14, which, according to the position of the shaft 11, makes contact with either 8 or 9 or, as is the case in the illustration, stands upon the insulated part between these contacts.

15 is an auxiliary motor. Motion in one or the other direction is imparted to the shaft 16 by means of the motor 15, all according to whether the spring 14 is in contact with either 8 or 9. The shaft 16 carries a crank-disk 17, two beveled wheels 18 and 19 engaging into a third bevel-wheel 20, the whole, forming a so-called "bevel-wheel gearing," being particularly represented in Fig. 13 and hereinafter more fully described.

The bevel-wheel 20, the motor 15, and the shaft 16 run in the direction indicated by the arrows. The wheel 20 has its bearing upon a shaft 21, carrying a part of the coupling mechanism 22, the other part of the coupling having its bearing upon the shaft 23, located in a bearing 24, capable of sliding and rotating and carrying, furthermore, a contact-brush 25.

26 represents a spiral spring, which at one extremity is fixed to the bearing 24 and at the other extremity to the coupling 30 and constantly tends to push the shaft 23, together with the coupling 30, as well as the contact-brush 25, to the right-hand side and to rotate the whole in the direction of the arrow.

27 and 28 indicate a series of contacts for the resistance 29, which is introduced into the current of the hoisting-motor 4.

28 represents an insulated part. The more the contact-brush is in circuit moved from 28 to 27 the less resistance is there, and when the brush stands upon the contact 27 no resistance is introduced at all. A disk 30, having a projection 31, is rigidly connected to the shaft 23.

The numerals 32 34 represent a circuit-breaker rotating around 33 and effecting the breaking of the circuit at 34. When the projection 31, during the rotation of the disk 30, pushes against the lever of the circuit-breaker 32 34, the said lever is caused to rotate around the point 33 contrary to the tension of the spring 35, the circuit thus being broken at 34.

36 is a crank-lever sliding within the slot 54 of the connecting-rod 37, the latter being pivoted at a fixed point 38.

39 is an electromagnet having an armature 40. The lever 42 is pivoted at a point 43 and is linked to the rod 37 at 41 and 38 carrying the armature 40.

At 44 the lever 42 presses against the shaft 23 and displaces the same from the left to the right hand side, when the connecting-rod 37 and the rods 41 38 are moved to the right-hand side by means of the crank-lever 36. The electromagnet 39 when excited is strong enough to keep the armature 40 in position, but too weak to attract the same.

45 52 represent a circuit-reverser changing the direction of the current either within the magnet or within the armature of the hoisting-motor 4. In the example illustrated in the drawings the circuit of the magnet is reversed.

The reversing of the mechanisms 45 52 from the position illustrated 49 46 and 51 48 into the position 49 45 and 51 47 takes place when rotation is imparted the crank-disk. The action is as follows: The crank-lever 36 moves from the left to the right hand side, the position illustrated being the point of start. Thereby first the connecting-rod 37 oscillates on its pivot at 38, the point 53 being pushed upward. The crank-lever 36 then slides along the slot 54. The point 53 then lies above the point 52. When the movement of the crank-lever 36 is continued, the same will push against the right-hand extremity of the slot 54, drawing the connecting-rod 37, so that the point 53 lies above the point 52 and the latter is forced to make the descent together with the point 53. The lever provided with the point 52, oscillating around 50, brings the circuit-reversing mechanism from the position 49 46 and 51 48 into the position 49 45 and 51 47. When the direction of rotation of the crank-disk is reversed, the circuit-reversing mechanism is turned to the opposite direction.

In order to prevent the circuit-reverser from being moved so far that the point 53 cannot grip above or underneath the point 52, which would be the case if the lever 55 52 were rigidly connected to the reversing mechanism, the lever is provided with a slot 55, within which slot slides a bolt 57, rigidly connected to the circuit-reverser. A helical spring 56 keeps the lever 52 55 in middle position. Thus the latter is moved somewhat farther than the reverser, and as soon as the pressure of the point 53 lessens returns into its original position.

My improved controlling mechanism works as follows: First, the governing-pulley 12 is rotated in the direction of the arrow 13ᵗ. Thereby the contact-spring 14 is pressed against the contact-rail 9, the circuit $a$ thus being closed, and the current flows from +, spring 14, contact-rail 9, left leg of the magnet of the motor 15, the electromagnet 39, into —. The auxiliary current $a'$ flows through the armature of the motor 15, circuit-breaker 34, into the circuit $a$. Now the auxiliary motor 15 receives current and rotates the shaft 16 in the direction indicated by the arrow. When the circuit-reverser is not in the position required, the alteration of position is effected in the manner heretofore described. By the rotation of the crank-disk 17 the connecting-rod 37 is moved from the left to the right hand side. The armature 40 is thereby attracted by the magnet 39, which is excited by the circuit $a$. The lever 42 is moved to the right, and consequently the shaft 23, contrary to the action of the spring 26, is subjected to the same movement. The contact-brush 25 is thereby pressed against the insulated piece 28 and the coupling 22 comes into action. When the shaft 16 is rotated, owing to the bevel-wheel gearing 18 19 20, the shaft 21 is rotated and the coupling 22 draws the shaft 23 contrary to the tension of the spring 26. Thereby the contact-brush 25 is moved from the insulated part 28 onto the series of contacts 27 28, the circuit $c$ and $c'$ being thus closed. This is particularly illustrated in Figs. 15 and 15ᵃ. In Fig. 15 the armature is not yet attracted and the brush is not in contact with the series of contacts 27 28. In Fig. 15ᵃ the magnet 39 has attracted its armature 40, and consequently the lever 42, so that the contact-brush 25 pushes against 28. The current $c$ flows from + through the armature of the hoisting-motor 4, through the resistance 29, the contacts 28 27 into —, while the current $c'$ flows from one pole of the armature of the motor 4 to the circuit-reverser 46 49 to the right leg of the magnet, then through the left leg back to the circuit-reverser 51 48, and from here to the resistance 29 into the circuit $c$. Owing to these circuits the motor 4 is actuated in the direction indicated by the arrow, the pulley 6 and disk 10 being slowly rotated. The motor 15 rotates the shafts 21 and 23, coupled together, until the contact-brush 25 has reached the last contact. Thus the resistance being cut out the hoisting-motor 4 works with all its power. In this movement the disk 30 has been rotated so far that the bolt 31 has opened the circuit-breaker 32 34, as above described, whereby the circuit $a'$ is broken and the motor 15 stopped. The bevel-wheel gearing is so adjusted that the opening of the circuit-breaker takes place when the crank-disk 17 is in the position shown in the drawings, thereby allowing the return of the connecting-rod 37 when the armature 40 leaves the magnet 39. The hoisting-motor 4 continues to run until the pulley 6, the shaft 7, and the disk 10 are turned around so far that the contact-spring 14, hitherto in contact with the plate 9, reaches the insulated part at 10. The circuit $a$ is opened and the armature leaves its magnet 39. Owing to the action of the spring 26 the shaft 23, together with the one part of the coupling 22, contact-brush 25, disk 30 and the rod 42, armature 40, rod 37, are moved to the left. Owing to this displacement the coupling is disengaged and the circuits $c$ and $c'$ are broken by removing the brush 25. When the coupling is disengaged, the brush 25, as well as the disk 30, &c., owing to the pressure of 26, return into the position represented in the drawings and the circuit-breaker 32 34 is closed by the spring 35. When the circuits $c$ and $c'$ are interrupted, the motor 4 stops motion. If now the governing-disk 12 is further rotated in the same direction and the circuits $a$ and $a'$ again closed, the process is repeated and the motor 4 each time runs until the spring 14 comes to rest upon the insulated part at 10. The greater the displacement of the spring 14 the farther the cage runs, or, more precisely, the longer will the motor 4 run. When the direction of rotation of the governing-disk 12 is reversed—that is to say, when the disk is rotated in the direction $13^{II}$—the circuits $b$ $a'$ $c$ $c'$ are created. The motor 15 runs in reverse direction, the circuit $b$ creating a polarity contrary to that of the circuit $a$. The position of the circuit-reverser is altered, as above described, the circuit $c'$ runs in the opposite direction through the magnets of the motor 4, and the latter rotates in a direction contrary to that first described. Also the disk 10 rotates now in a reversed direction and interrupts the circuit $b$ as soon as the spring 14 comes to rest upon the insulated part of the disk 10, the function of all parts in general remaining the same as above described.

In elevators having certain points of stop the above-described governing-disk 12, (illustrated in Fig. 1,) with the rope 13 and rotatable contact-spring 14, may be replaced by a number of rigid contact-springs, which by means of wires are connected to a corresponding number of switches fixed to the different points of stop. In Fig. 2 such an arrangement is illustrated diagrammatically. As in Fig. 1, 4 is the hoisting-motor, 29 the resistance, 25 the contact-brush, 45 51 the circuit-reverser for the magnets of the hoisting-motor, 32 34 the circuit-breaker for the auxiliary motor 15, 39 the magnet similar to Fig. 1. 8 9 illustrate contact-rails upon the rotatable disk 10. $14^{I}$ $14^{IV}$ are springs having the purpose to replace the rotatable springs 14. 58 61 illustrate switch mechanisms arranged at the points of stop I IV—for instance, arranged in the different floors of a house. 62 65 illustrate magnetic coils for the switch mechanism 58 61.

Figs. 3 and 4 illustrate detail views of the switch mechanism. The arrangement illustrated merely is an example, as numerous similar arrangements may be employed. Fig. 3 illustrates a side view, and Fig. 4 a plan view, of the apparatus. 66 represents a magnet having an anchor 67, rotatable by means of a handle 68. 69 illustrates a spring tending to rotate the anchor so that the circuit-breaker 70 71 is open and the anchor comes to lie against the projection 72. The working of the apparatus is as follows: By means of the handle 68 the armature 67 is rotated so far that the circuit-interrupter 70 71 is closed. Thereby the circuit $a$, the run of which is clearly indicated in Fig. 2, is closed, and the current flows from +, the right leg of the magnet of the motor 15, the contact-rail, contact-spring $14^{IV}$, switch mechanism 61, magnets $62^{I}$ $65^{IV}$ 39 into −, and the auxiliary current $a'$ through the armature of 15, circuit-breaker 34 32, into circuit $a$. The magnet is thereby excited and the armature 67 attracted so strongly that the spring 69 is not strong enough to effect a return into the original position. When the circuit $a$ is interrupted, the armature leaves the magnet and, owing to the spring 69, returns into its original position, thus leaving the interrupter 70 71 open. The magnets of all switches being in series, they will all be excited when any of them is excited by closure of the circuit. The attachment of the handle 68 allows of their rotation being independent of the armature. In consequence thereof no switch can be closed when in one of them a contact is created, but neither can this contact be broken before the circuit $a$ is broken from another point. The arrangement illustrated in Fig. 2 works in the following manner: Suppose the cage stands on the third floor and it is to be raised to the fourth floor. The described switch 61, (illustrated in Fig. 2 and consisting of the parts shown in Figs. 3 and 4,) is then closed, whereby the circuit $a$ is completed. The circuit starting at + runs through the right-hand magnet-coils of the auxiliary motor 15, through the contact-rail 9, and through the brush $14^{IV}$, the switch 61, and then through all coils 62 65, so that all armatures are attracted from their magnets, and the closing of another switch mechanism, as well as the opening of 61, being absolutely prevented. The circuit $a$ then flows through the coil 39 to −. The auxiliary circuit $a'$ commences at 61, runs through the armature of the motor 15, through the circuit-breaker 32 34, into the circuit $a$, and actuates the motor 15. The process generally is the same as described in Fig. 1. The disk 10 rotates in the direction of the arrow until the contact-spring $14^{IV}$ pushes against the insulated part at 10, the circuit $a$ being thereby interrupted, (the circuit $a'$ having been interrupted beforehand by the interrupter 32 34.) The consequence thereof is that not only the magnet 39, but also all magnets 62 65 repel their armatures, the switch 61, Fig. 2, then being opened by the spring 69, Fig. 4. When a switch in a floor situated underneath the one in which the cage stands—as, for instance, 59—is closed, the circuit $a$ would run through the left-hand magnet of the auxiliary motor 15 and through the contact-rail 8, through the spring $14^{II}$, and through the switch 59. The auxiliary motor then rotates in the reverse direction and the circuit-reverser 58 61 is altered in position. The subsequent path of the current is similar to that described in Fig. 1. The disk 10 rotates in reverse direction until the insulated part has reached the contact-spring $14^{II}$, the circuit being thereby interrupted and the cage stopped. By this arrangement it is attained that the cage runs to the floor in which one of the switches 58 61 is closed, it being not material whether the cage was standing at the first or at the fourth floor. It is impossible to intercalate more than one switch, owing to the arrangement illustrated in Figs. 3 and 4.

In the arrangement illustrated in Fig. 1 the movement of the cage can be governed from the inside as well as from the outside when two ropes are employed, one outside and the other inside, both at their extremities being connected, thus forming an endless rope.

In the arrangement illustrated in Fig. 2 the governing can only be effected from the outside.

When the cage, as per illustration in Fig. 7, is to be governed both from the inside and from the outside, there is arranged in the shaft and at the height of each floor a switch mechanism which can be reached from the inside of the cage, while for the outside governing-switches for all floors are arranged at the outside of the shaft, or use may be made of a combination-switch having two handles, one which can be operated from the outside, the other one from the inside. Such a combination-switch is represented in Figs. 5 and 6 in two positions. 86 is a magnet corresponding to 66 in Figs. 3 and 4. 87 illustrates the armature suitably guided at 88 and 89, so that it is forced to move against the magnet 86. 90 to 93, Figs. 5 and 6, represent disks rotatable around their center by means of the handle 94, provided with a nose 95 and a part of the switch 96. Helical springs 99 are employed for keeping the disks 90 in position. The armature 87 is provided with a number of slots 97, corresponding to the number of the noses 95. Fig. 5 shows that when one of the disks 90 93 is rotated its nose 95 slides into the slot 97 and withdraws the armature 87. Fig. 6 illustrates this position with the disk 93, and from this illustration it may be seen that the other disks 90 92 cannot be rotated, for the reason that the nose 95 presses against the anchor 87. When one disk is turned around, the circuit-interrupter 96 is closed, and the operation will be the following: When a disk— as, for instance, 93—is turned to the right-hand side by means of the handle 94, the projections 95 withdraws the armature 87 and closes the switch 96. The circuit $a$ of the magnet 86 is thereby closed. The path of the current is illustrated in Fig. 7. The magnet 86 attracts the armature and holds the same tight, so that the springs 98 and 99 are not able to effect its return before the circuit is broken from another point. The circuit $a$ includes all the magnets 86— that is, through all the magnets in all floors— and the armatures are attracted by the magnets. Any other switch is prevented from being closed. When the circuit $a$ is interrupted, the armature 87 and the disk 93 quickly return into their original position.

In Fig. 7 the whole switch mechanism for governing the cage is clearly to be seen outside and inside the shaft. The lettering corresponds to the switch illustrated in Figs. 5 and 6 and to the switch necessary for the arrangement illustrated in Fig. 2. In the diagrammatic view it is supposed that the switches marked 96 and arranged at the right-hand side of the line 104 can be reached from the outside. Those illustrated on the left-hand side of 104 can be reached from the inside of the cage. Further, it is supposed that the cage stands in the third floor and that from the cage the switch for the fourth floor is closed, so that the cage runs to this fourth floor. The actuation is the same as described in Figs. 1 and 2. If owing to any circumstance it is impossible to arrange a switch, as illustrated in Figs. 5 and 6, in all the floors, such an apparatus may be arranged in the cage itself in such a manner that the circuits 100 103 are connected to the circuits $14^I$ $14^{IV}$ by means of sliding contacts. In similar way the switch would have to be connected with the circuit 104. The outer switch would have to be the one represented in Figs. 3 and 4.

In Fig. 8 the inner and outer governing is supposed to be arranged within the cage. Furthermore, the contact-disk 10 and the contact-rails 8 and 9, Figs. 1 and 2, are replaced by wires within the shaft. The circuits 74 77 correspond to the contact 9, Fig. 2, and the circuits 82 85, Fig. 8, correspond to the contact 8, Fig. 2. Owing to the sliding contacts 78 81, Fig. 8, the outer switches 58 61 are connected to the inner switches. It is supposed that the inner switch for the fourth floor is closed and the run of the circuit is illustrated in conformity. The cage moves upward until the contact $14^{IV}$ comes to rest upon the interrupting part between 74 and 82, thereby effecting the interruption of the circuit similarly to the manner described in Figs. 1 and 2. In the switch described in Figs. 1 to 8 it is supposed that the armature of the auxiliary motor 15 is in shunt parallel to the magnet 39 and that the circuit $a'$ is closed as soon as the resistance 29 is cut out. The switch may be modified by shunting the magnet 39 behind the armature of the motor 15, whereby the armature of the motor after the resistance is cut out is closed by the switch 32 34. The switch corresponding to the illustration of Fig. 2 is represented in modified form in Fig. 9. As in Fig. 2, the switch 61 is supposed to be closed and the circuit is illustrated in conformity therewith. Generally the whole arrangement will be clear from the foregoing specification. In Fig. 1 it is supposed that the rod 38 41 forms one single part, so that when the magnet 39 repulses the armature 40 the crank-lever 37, together with the armature 40 and the connecting-rod 38 41, may return into the original position, but only when the crank-lever 36 is in the position illustrated. This is not always the case—for instance, when the points of stop follow one another so rapidly that a complete intercalating of the motor 4 during the run cannot be effected. In this case the motor 15 continues its run even after the interruption of both circuits $a$ and $a'$ by the insulation 10. The crank-lever 36 then may stand so that the crank-rod 37 cannot return, the same being the case with the magnets 39, armature 40, rod 42, brush 25, rod 23, and coupling 22. The circuit to the motor 4 is not yet interrupted and the motor itself continues to run. This can be prevented by replacing the rod 37 and magnets 39, Fig. 1, by the mechanism shown in Figs. 10 to 12. The numbers 38 41 denote parts similar to those of Fig. 1. 106 are magnet-cores provided with prolongations of less diameter 109. These prolongations 109 are guided through the frame 107. The cores are connected together by a crosspiece or bridge 108, and owing to this they can be moved to the right or to the left. The spring 110 effects a displacement to the left of the magnets, and the crank-lever 36 in Fig. 1 at each rotation draws the cores to the right-hand side. The size of the apparatus is such that the magnets 106 109, Figs. 10, 11, and 12, are not able to attract the armature 40, but are able to keep it in a certain position.

The operation will be as follows: In Fig. 10 the coils are excited, the cores are lying against the frame 107, and the armature 40 is attracted by the magnets. When now the circuit is interrupted, the armature 40 returns into the position Figs. 11 and 12; but owing to the action of the spring 110 the cores will take an intermediate position according to the position of the crank-lever 36. The spring 110 is of a length as to be able to displace the latter to the left-hand side when the coils are excited and the armature 40 is not attracted by the magnets. When the circuit is shunted, the motor 15, Fig. 1, commences to run and the coil 39 is excited. During the first revolution of the crank-lever 36 the magnets 106 109 are drawn to the left by the spring 110, so that they come to rest against the armature 40, as represented in Fig. 11. During the second revolution of the crank 36 the cores 106 109 by means of the connecting-rod 37 are drawn to the right until they adopt the position Fig. 10; but the coils being excited the armature 40 is withdrawn. The cores 106 now are lying against the frame 107 and remain in this position until the circuit is interrupted. The armature 40, the rod 42, brush 25, rod 23, &c., return into the original position and the circuit to the motor 4, Fig. 1, is interrupted.

Fig. 13 shows a detail view of a bevel-wheel gearing, as represented diagrammatically in Fig. 1, as 18, 19, and 20. The two bevel-wheels 18 and 19, gearing with the wheel 20, are fitted loosely upon the shaft 16 and are secured against lateral displacement by means of collars 111. Between the two gears are arranged two sliding sleeves 113, having ratchet-teeth, which by means of feathers 114 are secured against rotation on the shaft. A spring 112, located between the sleeves, has the purpose to press the latter against the bevel-wheels 18 and 19. The contact-surfaces between the gearing and the slides form a coupling 115, the teeth of which are so directed that during the revolution of the shaft 16 in one direction one bevel-wheel and in the other direction the other bevel-wheel is idle, one bevel-wheel thus constantly running.

A modification of the governing represented in Figs. 1, 2, 7, and 9 is illustrated in Fig. 14. In this illustration the contacts 8 and 9 are not formed by rails fixed upon a disk, but by coils wound upon a cylinder. Thereby a more exact adjustment of the contact 14 is rendered possible.

In elevators it is desirable to render the governing dependent on both the opening and closing of the doors. This is effected in the most simple manner by conducting the circuit $a$ and $b$ or $b$ alone through the interrupter 116 118, Fig. 16, connected with the doors 119 in such a way that they are opened and closed at the same time when the circuit is opened or closed. The elevator cannot be actuated without all doors being closed. As soon as one of the doors is open the stopping of the elevator takes place by the interruption of the steering-circuit.

Having thus fully described the nature of my invention, what I claim, and desire to secure by Letters Patent of the United States of America, is—

1. In a controller for electric elevators and the like apparatus, the combination with an auxiliary motor fed from the governing-circuit, a circuit-reverser introduced into the circuit of the hoisting-motor and controlled by the auxiliary motor, a contact series for the resistance, a contact-brush sliding upon said contact series, a bevel-wheel gearing, a coupling mechanism one part of which is rigidly connected to the brush, and the other part to the bevel-wheel gearing, a magnet excited by the governing-circuit, the armature of which is connected to a rod provided with a projecting part causing the coupling or uncoupling of the coupling mechanism, a circuit-reverser, the whole for the purpose as set forth.

2. In a controller for electric elevators, and the like apparatus, the combination with an auxiliary motor of a crank-disk arranged upon the shaft of the armature of the auxiliary motor, a crank-pin applied to said disk, a connecting-rod provided with a slot, the crank-pin adapted to move in said slot while rotated with the crank-disk and causing the rod to move forward and backward, said connecting-rod influencing on one hand the reversing mechanism and on the other hand the coupling, the whole for the purpose as set forth.

3. In a controller for electric elevators and the like apparatus, the combination with an auxiliary motor, of a number of spring-contacts 14¹, each of them being connected to the hoisting-motor, and arranged in distances corresponding to the distance of points of stop of the cage, a disk 10 provided with contacts 8 and 9 arranged upon the disk 10 and isolated from each other, the said contact-springs 14¹ being adjusted so that the respective contact of a certain point of stop of the cage comes to rest between the contact-rails 8 and 9 upon the insulated parts, the whole for the purpose as set forth.

4. In a controller for electric elevators and the like apparatus, the combination with an auxiliary motor, of switches arranged in each floor in number corresponding to the number of floors to be attended, each of the switches adapted to be actuated separately, and means for preventing the actuation of the other switches, substantially as set forth.

5. In a controller for electric elevators and the like apparatus, the combination with an auxiliary motor, of a mechanism for altering the position of the circuit-reverser for the hoisting-motor, consisting of a crank-rod 37 pivotally connected to a cross-piece or bridge 108, said bridge carrying two magnet-cores 106 provided with prolongations of less diameter 109, a frame 107 provided with recesses in which the prolongations 109 are guided, an armature 40 applied to a rod 41, said rod being in connection with a rod 42 provided with a projecting part 44, and pivoted at 43 so as to be turned, said projecting part causing the coupling of the coupling mechanism 30, 22, for the purpose as set forth.

6. In a controller for electric elevators and the like apparatus, the combination with an auxiliary motor, of a coupling mechanism 30, 22, the part 22 being arranged upon the axle of the bevel-wheel 20, the part 30 being arranged upon the coupling-rod 23, said coupling-rod being influenced on one hand by the projecting part 44 of the rod 42, and on the other hand by a spring 26, the coupling-disk 30 being provided with a pin 31 adapted to influence the circuit-breaker 32, 34, the whole for the purpose as set forth.

7. In a controller for electric elevators and the like apparatus, the combination with an auxiliary motor, of a bevel-wheel 20 communicating motion to the contact-brush 25, two bevel-wheels 18 and 19 loosely fitted upon the axle 16 of the armature of the auxiliary motor 15, said wheels meshing with the bevel-wheel 20, two sliding sleeves 113 pressed against the bevel-wheels by means of a spiral spring 112 and provided with ratchet-teeth 115, said teeth being directed in such manner, that during the revolution of the shaft 16 in one direction one bevel-wheel, and in the other direction the other bevel-wheel is idle, while one is constantly running, the sliding sleeves being secured against rotation on the shaft by feathers 114, the surfaces between the gearing and the slides forming a coupling, collars 111 arranged upon the shaft 16 securing the wheels 18 and 19 against lateral displacement, the whole for the purpose as set forth.

8. In a controller for electric elevators and the like apparatus, the combination with an auxiliary motor, of a switch mechanism consisting of a contact-brush 25, a series of contacts 27, 28, the brush 25 being arranged upon a cone mounted upon the connecting-rod 23, said brush adapted to slide upon the contacts 27, 28, the whole for the purpose as set forth.

In witness whereof I have hereunto set my hand in presence of two witnesses.

EMIL ALFRED WAHLSTRÖM.

Witnesses:
HERMAN WAGNER,
WM. HAHN.